United States Patent [19]

Noyes et al.

[11] 4,045,283
[45] Aug. 30, 1977

[54] CONTROL ROD AND/OR INSTRUMENT TREE ASSEMBLY

[75] Inventors: Richard Croissant Noyes, Hartford, Conn.; Clive Frederick George Dupen, Encinitas; Donald Martin Barrus, Poway, both of Calif.; Edward Arnold Siegel, Bloomfield, Conn.

[73] Assignee: Combustion Engineering, Inc., Windsor, Conn.

[21] Appl. No.: 537,283

[22] Filed: Dec. 30, 1974

[51] Int. Cl.[2] ............................................... G21C 7/08
[52] U.S. Cl. .................................................... 176/35
[58] Field of Search ..................... 176/19, 30, 35, 31, 176/32, 36; 214/18, 28

[56] References Cited

U.S. PATENT DOCUMENTS

| | | | |
|---|---|---|---|
| 2,898,281 | 8/1959 | Untermeyer et al. | 176/36 R |
| 3,146,900 | 9/1964 | Anderson | 176/30 |
| 3,841,964 | 10/1974 | Dumayne | 176/30 |
| 3,940,311 | 2/1976 | Frisch et al. | 176/35 |

*Primary Examiner*—Samuel Feinberg
*Attorney, Agent, or Firm*—Stephen L. Borst; Richard H. Berneike

[57] ABSTRACT

An improved core servicing apparatus for a nuclear reactor having a vessel, a head for the vessel, one or more penetration openings in the head and a core within the vessel of the type having an array of fuel assemblies and including apertures in the array for neutron absorbers. The servicing apparatus includes a support column adapted to be supported by and depend from the head in registry with a penetration opening; a plurality of core servicing elements which may include neutron absorber actuating means and/or instrument packages are supported by the support column; and means are provided for laterally displacing at least some of the servicing elements relative to the support column between a laterally compact and a laterally expanded configuration.

In one embodiment, instruments may be located at the lower end of long resilient cables and are longitudinally movable within and beyond guide channels supported by the support column. The guide channels are directed outward at their lower ends to direct a descending instrument and cable outwardly.

9 Claims, 18 Drawing Figures

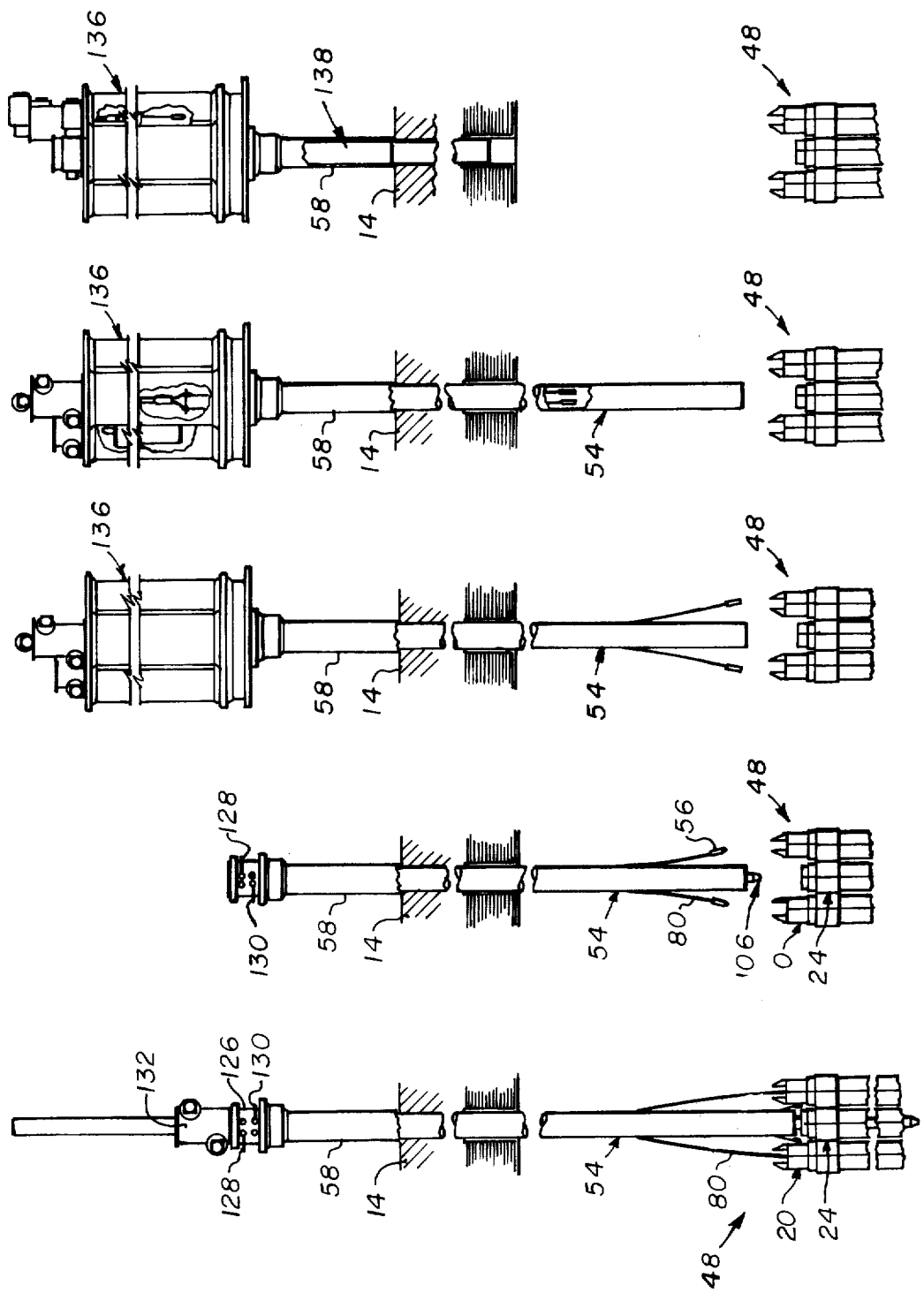

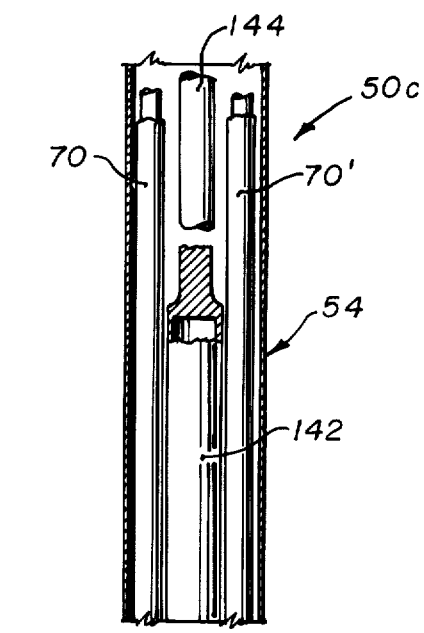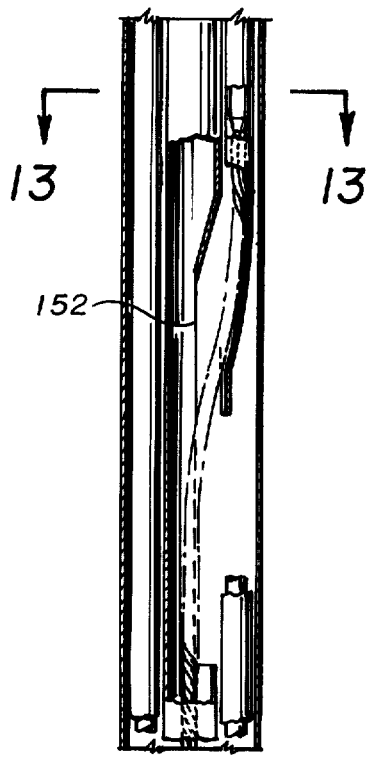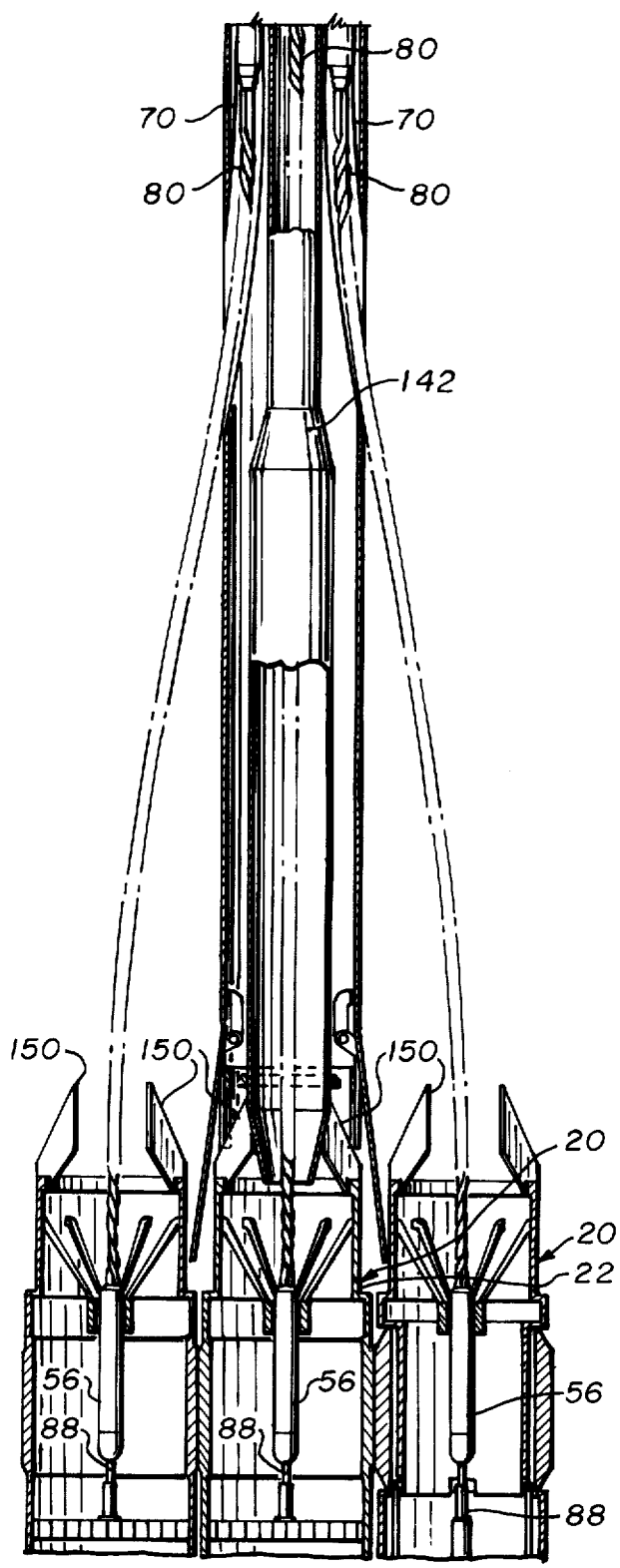
FIG. 11  FIG. 12

CONTROL ROD AND/OR INSTRUMENT TREE ASSEMBLY

BACKGROUND OF THE INVENTION

The invention relates generally to nuclear reactors, and more particularly to apparatus for servicing the core of a nuclear reactor.

In nuclear reactors, it is generally necessary to provide neutron absorber control elements as well as various types of instrumentation for servicing the nuclear core, particularly during operation. Such servicing elements typically enter the reactor through penetrations in a head portion of the reactor. In some instances separate penetrations are provided for the neutron absorbers and others for the instrumentation and in other instances a neutron absorber and instrumentation may be combined in a single package, there being a multiplicity of such arrangements for a reactor.

Further, in certain types of reactors, particularly liquid metal fast breeder reactors, it may be desirable to refuel the reactor without removing the head. This aids in preventing the mixing or contact of liquid metal coolants such as sodium with air and further avoids the release of fission gases. To accomplish the refueling, rotating plugs or shields which serve to close off and seal the reactor vessel during normal reactor operation have been used previously. One example of such an arrangement is seen in U.S. Pat. No. 3,354,040 to A. G. Frame et al. While that patent shows a single large rotating head with a mechanism which transfers fuel between the core and a magazine housed within the environment of the core, other such reactors have incorporated one or more smaller rotating plugs within the larger plug and provide fuel transferring apparatus for removing the fuel entirely from within the reactor vessel. In any event, it becomes desirable to reduce the number of penetrations through the head and/or to reduce the size of each penetration. Such reduction in numbers of penetration and size of penetration serves both to enhance the strength of the head and to allow the greater flexibility in the placing of the fuel handling apparatus and any smaller rotating plugs within the area of the large rotating head portion.

While the above mentioned Frame patent does combine several instrument packages with a neutron absorber actuator for each core servicing assembly which penetrates the rotating head, the lateral dimension of the head penetration required to receive such a servicing assembly is relatively large, creating the drawbacks mentioned above.

SUMMARY OF THE INVENTION

The above mentioned and other disadvantages are alleviated by the improved core servicing apparatus for a nuclear reactor according to the invention. The improved core servicing apparatus is for a nuclear reactor having a vessel, a head for the vessel, one or more penetration openings in the head, and a core within the vessel of the type having an array of fuel assemblies and including apertures in the array for neutron absorbers. The improved core servicing apparatus comprises a support column adapted to be supported by and depend from the reactor head in registry with a penetration; a plurality of core servicing elements which may include a neutron absorber drive column or actuator and/or instrument packages are supported by the support column; and means are provided for laterally displacing at least some of the elements between retracted and extended positions relative to said support column, whereby to vary the servicing apparatus between a laterally compact and a laterally expanded configuration.

The core servicing elements may be arranged such that a central element is surrounded by a ring of the other elements. The elements in this ring are laterally displaceable by the displacing means and generally comprise instrument packages. The central servicing element may be an additional instrument package or may be, alternatively, the actuating mechanism for a neutron absorber.

The core servicing apparatus of the invention may be admitted to the interior of the reactor vessel through a relatively small diameter penetration and some of the servicing elements may thereafter be laterally displaced to service a laterally enlarged area of the core. For instances, where the core comprises an array of fuel assembly clusters each cluster comprising a ring of side-by-side elongated fuel assemblies surrounding a central neutron absorber receiving aperture or assembly or another fuel assembly, a servicing element may be laterally displaced into alignment with each of the fuel assemblies in the ring, with the central servicing element being and remaining aligned with the central position in the fuel assembly cluster directly beneath the vessel head penetration. That portion of the servicing apparatus required to pass through the penetration, and accordingly the size of the penetration, may be no larger, laterally, than the central fuel assembly or neutron absorber aperture in a fuel assembly cluster.

The core servicing elements may be moved downward relative to the support column sufficiently to insert them within the shrouds or housings of the various assemblies of the core.

BRIEF DESCRIPTION OF THE DRAWING

FIG. 8a depicts the core servicing apparatus immediately prior to disengagement from a fuel cluster;

FIG. 8b depicts the apparatus following disengagement from a fuel cluster;

FIG. 8c depicts a handling cask positioned to receive the core servicing apparatus;

FIG. 8d depicts the instrumentation and control actuator mechanism withdrawn from the fuel cluster in the servicing apparatus;

FIG. 8e depicts a shield plug positioned within the penetration from which the core servicing apparatus was removed;

FIGS. 9, 10, 11 and 12 respectively depict, in elevational views partly in section, portions of a core servicing apparatus from top to bottom including only instrument packages as generally depicted in FIG. 1.

DESCRIPTION OF THE PREFERRED EMBODIMENT

Figure 1:
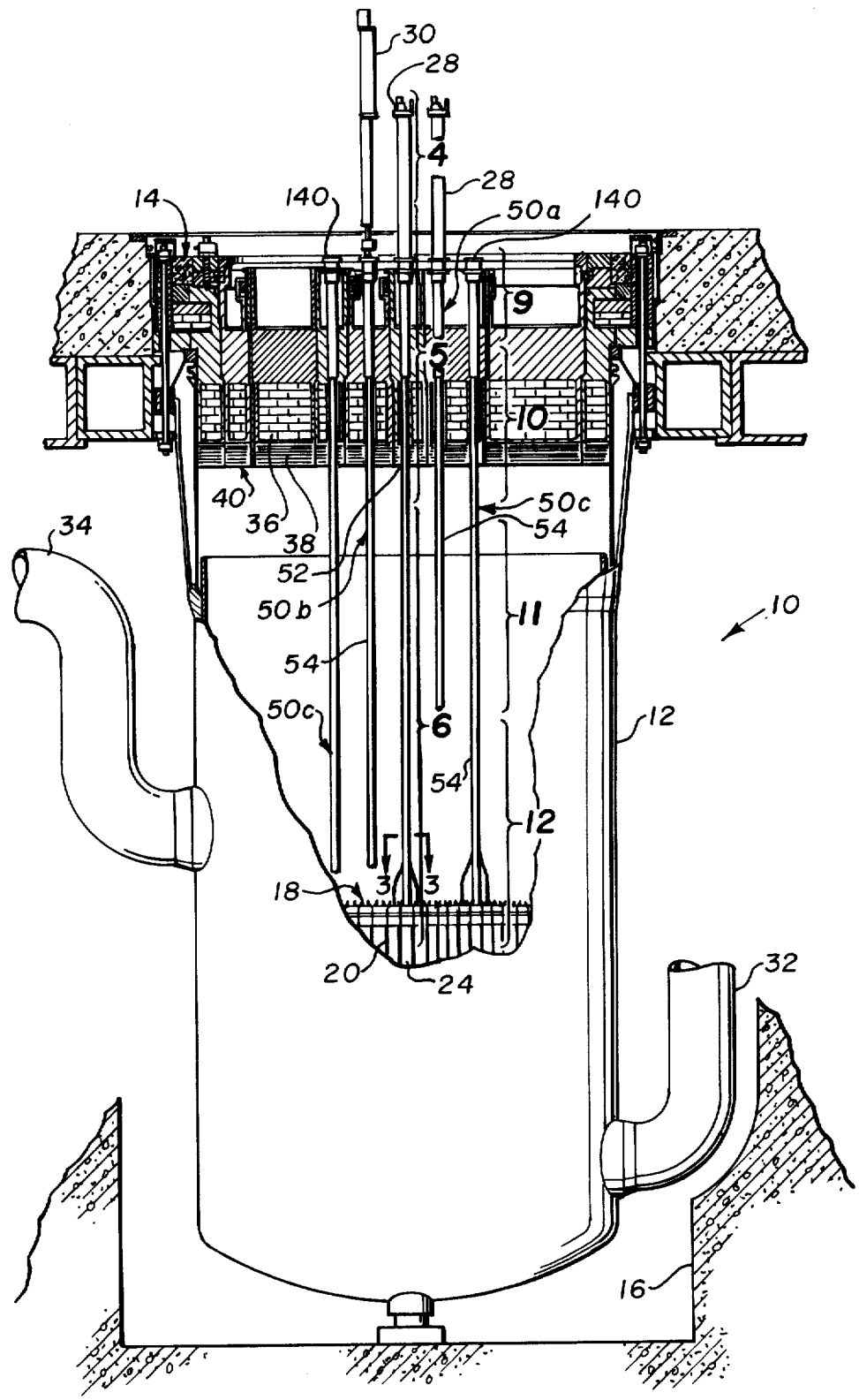
FIG. 1 is a sectional elevation of a nuclear reactor which incorporates the core servicing apparatus of the present invention, the view being taken along line 1—1 of FIG. 2.
Figure 2:
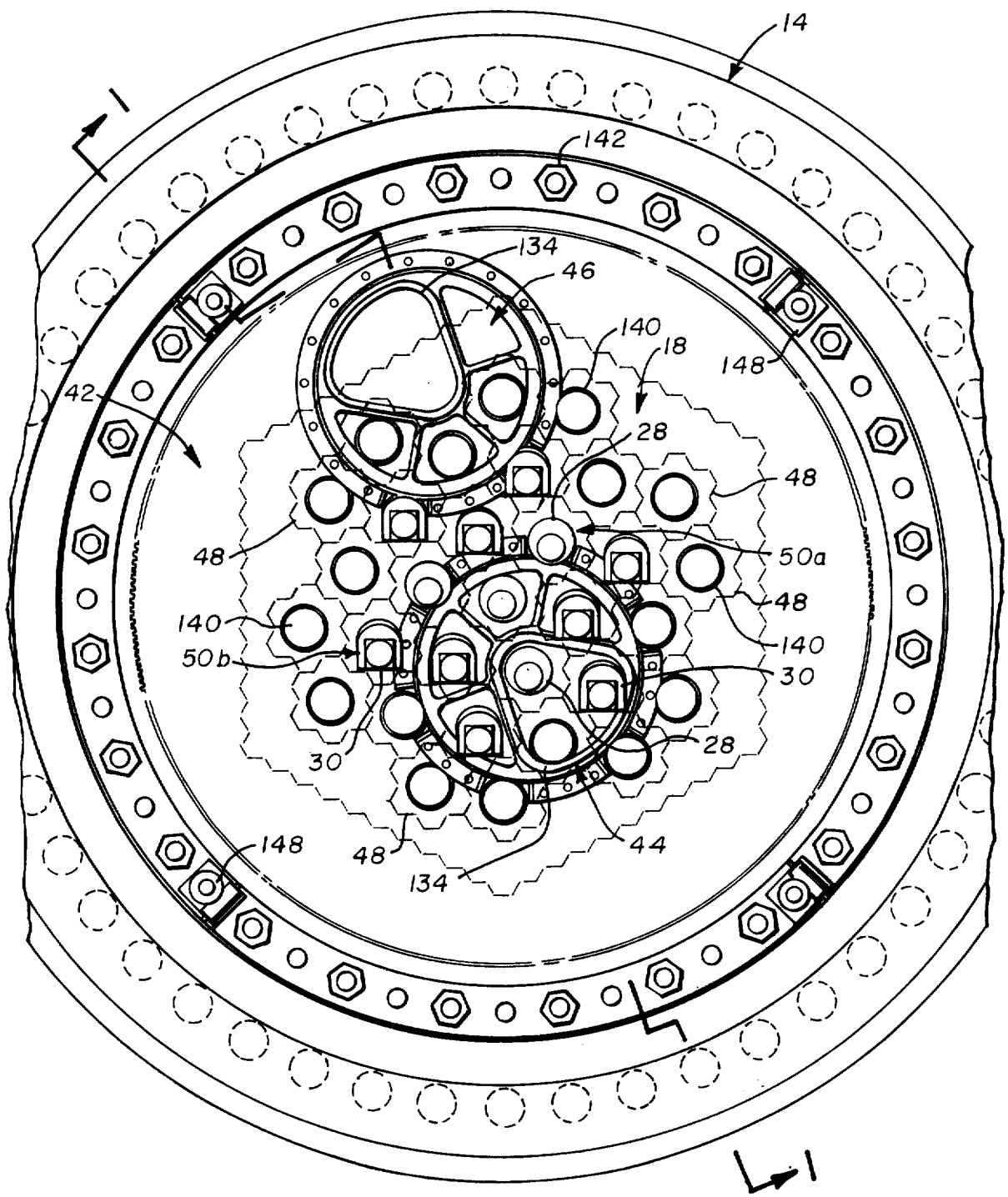
FIG. 2 is a plan view of the nuclear reactor of FIG. 1.

Referring to FIG. 1 there is shown generally a liquid metal, fast spectrum reactor 10 comprising a reactor vessel 12 and a reactor vessel head 14 vertically disposed and supported with a concrete containment structure 16. The reactor vessel 12 houses a nuclear core 18 comprised of a plurality of fuel assemblies 20 arranged and supported in a fixed array by a support structure (not shown), as is well known in the art. The fuel assemblies 20 are comprised of fuel pins within a shroud or housing and contain nuclear material for sustaining a nuclear chain reaction. The housings 22 of the fuel assemblies 20, as is conventional, are each of a hexagonal cross section. Interspersed within the array of hexagonally shaped fuel assemblies 20 and arranged in a regular pattern are a plurality of hexagonally shaped control assemblies 24. The control assemblies 24 are comprised of an elongated, hexagonally shaped housing 26 which forms an aperture 27 in the array and control elements (not shown), such as rods of a neutron absorbing material, adapted for longitudinal movement therewithin. Drive means 28 and 30, supported on the reactor vessel head 14 and extending downward therethrough and to be described in greater detail below, are coupled to the control elements for effecting longitudinal movement thereof to control and regulate the nuclear chain reaction in the core 18. By way of the nuclear chain reaction, substantial amounts of heat are generated within the core 18 and conveyed to a primary coolant, such as for example liquid sodium, which is introduced into and removed from the nuclear core 18 by coolant inlet and outlet conduits 32 and 34. The heated coolant may then be transported to a heat exchange medium (not shown) for the ultimate transformation of the thermal energy into electrical energy.

Generally, the reactor vessel head 14 serves to seal the reactor vessel 12 and provide biological shielding, thermal insulation and alignment between the nuclear core 18 and any interfacing system such as control, instrumentation, and core access systems. It is a general requirement that all penetrations and/or leakage paths and through the reactor vessel head 14 must be sealed to prevent ingress of gases into the reactor vessel 12 which might react with the liquid metal coolant and egress therefrom of possibly contaminated cover gas and released fission products. The biological shielding and thermal insulation may comprise a series of shielding blocks 36 and reflector insulating plates 38, respectively, housed within a welded steel enclosure structure 40.

For practical considerations related to safety and ease of manufacturing and construction of liquid metal fast spectrum reactors 10, control of the reactor and refueling operations take place through the top of the reactor vessel 12. Additionally, and in accordance with the invention, it is desirable that instrumentation of fuel assemblies 20 for monitoring the behavior of the liquid coolant in a nuclear core 18 also take place through the reactor vessel head 14.

In a preferred environment in which the invention is used, a vessel head arrangement achieves the desirable combination of a symmetrical control pattern and a limited opening core access system by providing a rotating cover or plug system comprised of at least three rotatably mounted covers or plugs 42, 44 and 46. Briefly stated, the rotating plug system comprises a large rotating plug 42 having a lateral dimension at least as large as the lateral dimension of the core 18 rotatably supported in, and forming part of, the vessel head 14 and at least two smaller rotating plugs 44 and 46 each rotatably supported within the large rotating plug 42. The lateral dimensions of the small rotating plugs 44 and 46 are related to the lateral dimensions of specified interfitting groups of nested assemblies 20 and 24 forming the nuclear core 18. Core 18 is divided into a plurality of interfitting clusters 48 defined in such a manner that every hexagonally shaped assembly 20 and 24 in a portion of the core 18 forms a part of one and only one cluster 48. Each cluster 48 includes either a central fuel assembly 20 or control assembly 24 and an even multiple of six encircling and contiguous fuel assemblies 20. In the arrangement under discussion, a cluster 48 includes a central assembly position and six surrounding fuel assemblies 20. However, additional larger diameter rings or circles of fuel assemblies 20 might additionally encircle the central assembly to comprise a cluster. As noted, each cluster 48 will include at least six fuel assemblies 20 and a central position which may either be another fuel assembly 20 or a control assembly 24. Either arrangement might be identified generally as a cluster or a fuel cluster 48. However, those which additionally include the central control assembly 24 will be referred to as a control cluster 48. The clusters 48 all interfit with one another to comprise the complete core 18.

The symmetrical pattern of control and instrumentations is achieved by having control and/or instrumentation penetrations in the vessel head 14 only over the center of a cluster 48. The opening through the vessel head 14 for the small rotating plugs 44 and 46 can then be placed so as to not interfere with or intersect the control and instrumentation penetrations. Most of the core is made up of these seven assembly clusters. The 13 centermost clusters in the core are control clusters, and control element drive mechanisms 28 and 30 are mounted on top of the vessel head 14 over these 13 assemblies.

According to the invention, core servicing apparatus including instrumentation and/or control element actuators extending through penetrations in the head 14 over only the central assembly of each cluster 48 are sufficient to provide the entire control actuator and instrumentation needs of the core 18. Stated another way, the apparatus of the invention provides means by which the servicing elements associated with each of the assemblies 20 and/or 24 in a particular cluster 48 may enter the vessel 12 through a single relatively small area of penetration in head 14 over the center of the particular cluster 48. The core servicing apparatus of the invention may be more specifically referred to as a control rod and/or instrument tree assembly 50 (hereinafter CRITA), of which there are three somewhat functionally different types. One type of CRITA is the Safety Control CRITA 56a, another type of CRITA is the Shim Control CRITA 56b, and the third is the Instrumentation CRITA 56c.

According to the invention, each CRITA 50 comprises a structure, at least a portion of which may be admitted to the interior of reactor vessel 12 through a penetration 52 in head 14 and includes means therewith for thereafter outwardly laterally displacing servicing elements, such as instrumentation packages. The Safety Control CRITA 50a and the Shim Control CRITA 50b are quite similar in that both provide for laterally displacing a series of six instrument packages arranged in a circle or ring about a central neutron absorber actuator mechanism. The major difference between these two types of CRITA is that the neutron absorber actuator for the Safety Control CRITA 50a is designed principally to insert the neutron absorber at a time of emergency or reactor shutdown, whereas the actuator for the shim control CRITA 50b is designed for continuous operation in controlling the reactor power level. Because of the similarity, only the safety control CRITA 50a will be described in detail, with general reference to the difference between it and the shim control CRITA 50b. Instrumentation CRITA 50c replaces the centrally located neutron absorber actuator mechanism of each other CRITA with a seventh instrument package. Accordingly, a safety or shim control CRITA 50a or 50b will be associated with a control cluster 48 whereas an instrument CRITA 50c will be associated with a general fuel cluster 48 having a seventh fuel assembly 20 occupying the central position. Each CRITA 50 includes a Guide Tube and Instrument Tree (GTIT) 54 having a support and guide tube 60 and a plurality of instrument packages 56. Additionally, safety rod CRITA 50a includes a control rod drive mechanism (CRDM) 28 and the shim rod CRITA 50b includes a somewhat similar CRDM 30.

Figure 4:
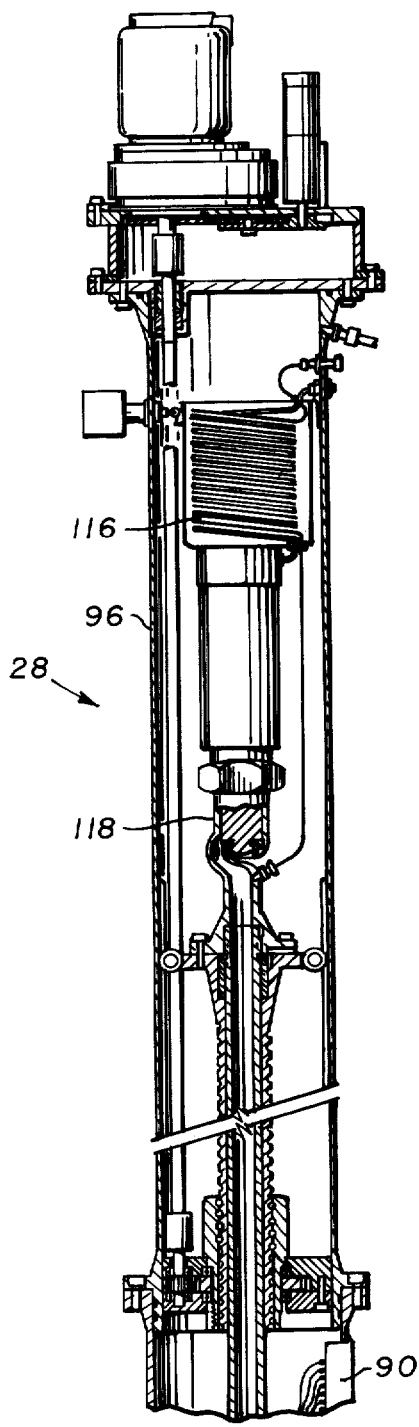
FIGS. 4, 5, and 6 respectively depict, in elevation and partly in section, parts of the core servicing apparatus from top to bottom as generally depicted in FIG. 1.
Figure 5:
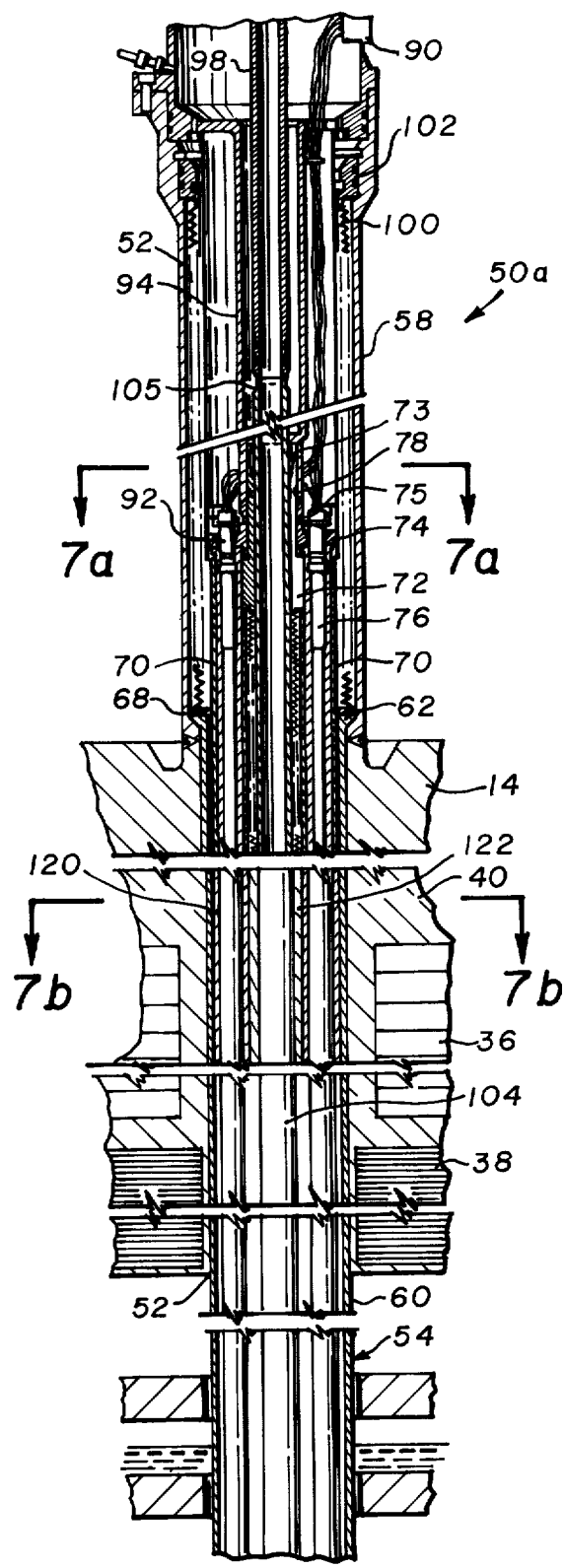
Figure 7A:
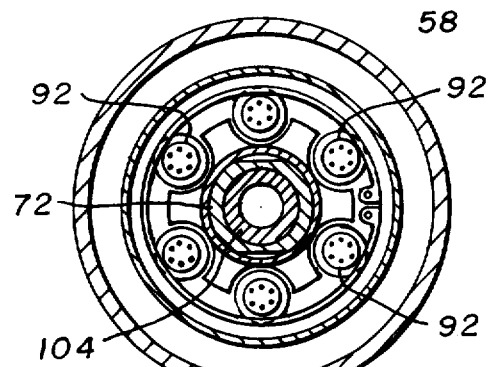
FIG. 7a is a plan view of the apparatus of FIG. 5 taken along line 7a—7a thereof.
Figure 6:
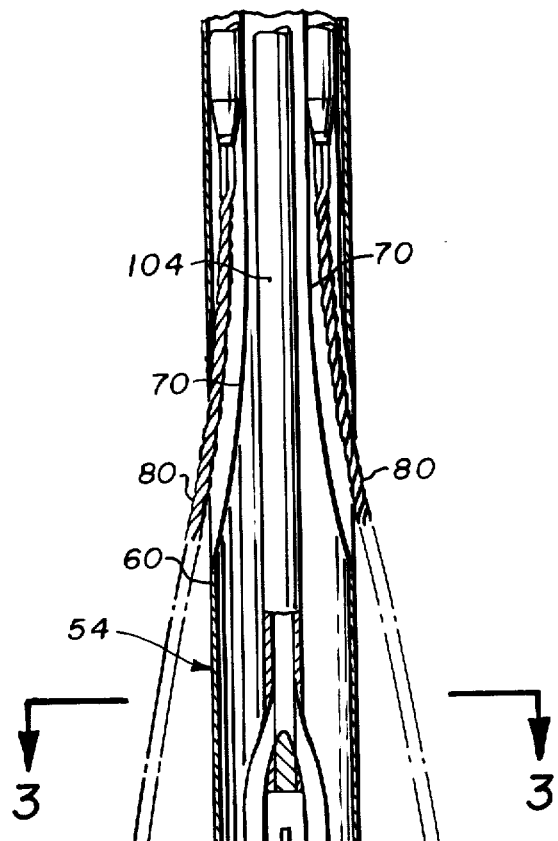
Figure 7B:
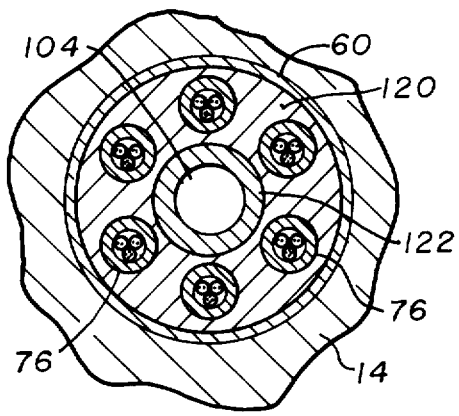
FIG. 7b is a plan view of the apparatus of FIG. 5 taken along lines 7b—7b thereof.
Figure 13:
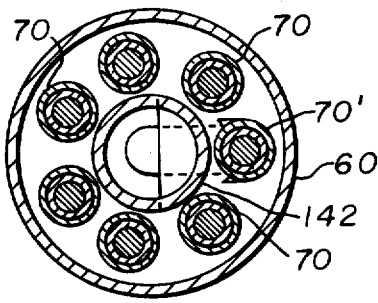
FIG. 13 is a plan view of the apparatus of FIG. 11 taken along line 13—13 thereof.
Figure 9:
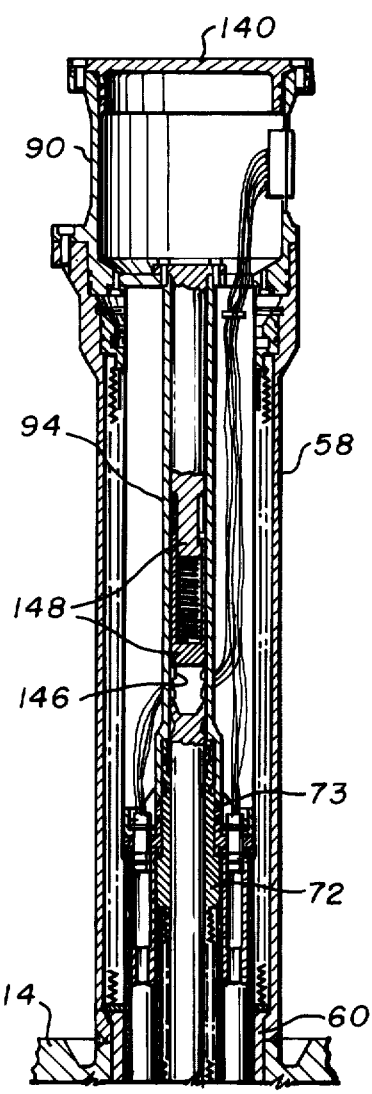
Figure 10:
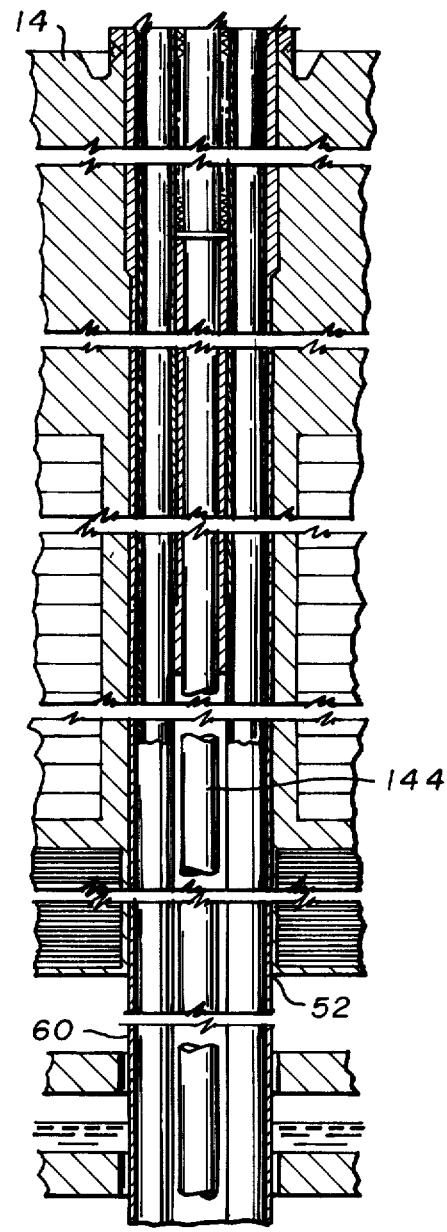

Referring now to FIGS. 4, 5 and 6 there is depicted a safety rod CRITA 50a. The GTIT 54 of CRITA 50a is supported within an upwardly extending nozzle 58 in the reactor vessel head 14. Nozzle 58 is in registry with a bore extending through the thickness of head 14 and together form penetration 52. GTIT 54 extends downward through the head 14 to above the core 18 and serves to guide the neutron absorber drive mechanism or actuator component of either a safety or a shim control CRITA and to support the core instruments 56 in the plenum above the core. The GTIT 54 includes an elongated guide tube 60 which is supported at the top of the head 14 by a support flange 62 and extends downward therefrom to within a specified distance, for instance an inch, of the shroud on the upper end of the control assembly housing 26. Six spreading fins, not seen in FIG. 4, are equally displaced about the top end of control assembly housing 26. The lower end of the guide tube 60 has six vertical slots disposed to match and embrace the six spreading fins for maintaining location during operation. Guide tube 60 also provides a backup mechanical holddown system for the control assembly housing 26 and for the adjacent six fuel assemblies 20 in a particular cluster 48 through six holddown fingers 64 hinged to the guide tube through supports 66 afixed to the interior surface thereof. Each finger 64 is positioned to be within a slot at the lower end of the guide tube. Holddown fingers 64 are free to pivot about a horizontal pivot contained by each support 66, and it normally extends downward in line with the wall of tube 60 until forced radially outward by contact with the upper surface of the aforementioned spreading fins.

Figure 3:
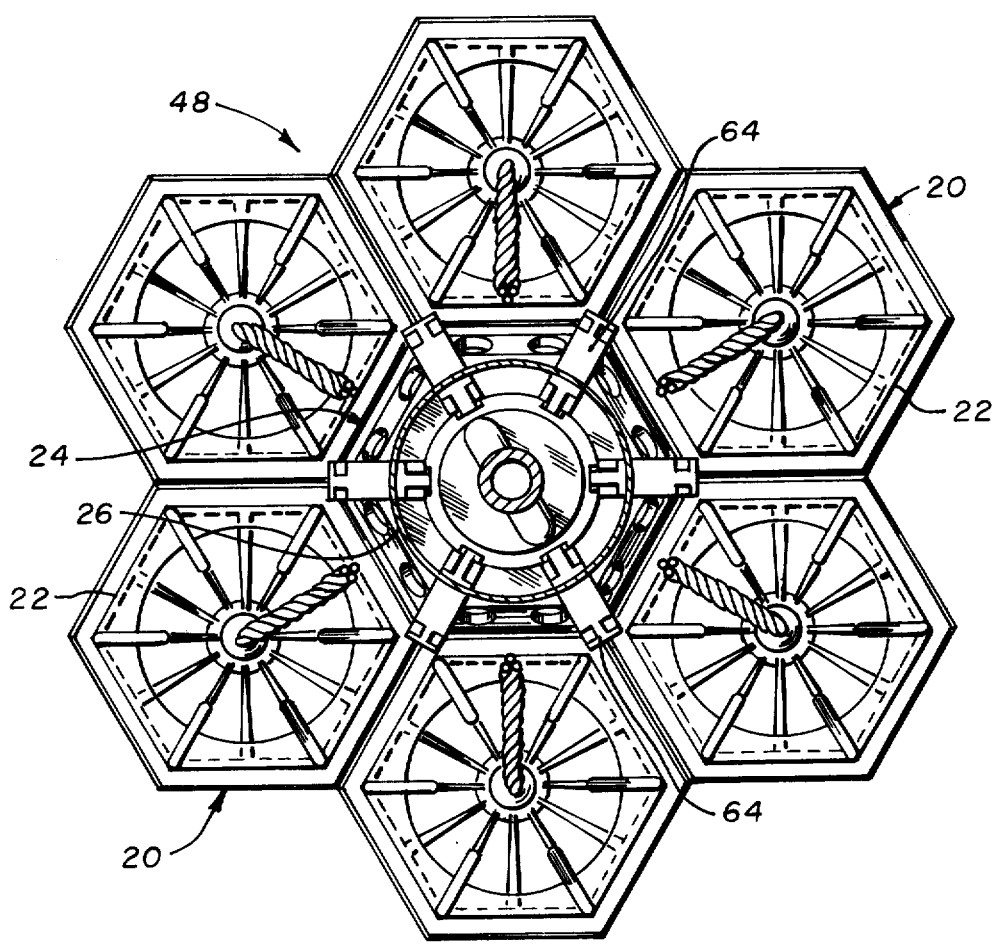
FIG. 3 is a cross-sectional plan view taken along lines 3—3 of FIGS. 1 and 6 showing a cluster of fuel assemblies including a central control aperture and the control mechanism instrumentation therewith.

In FIG. 6 the holddown fingers 64 have been rotated into the plane of the picture, however, the spreading fins have not been similarly rotated and thus do not appear. The spreading fins have a contour similar to guide fins 84. FIG. 3 does show each of the six holddown fingers 64 after spreading by downward contact with the spreading fins which cam them outward. The length and angle of the outwardly cammed holddown fingers 64 and the vertical positioning of the lower end of guide tube 60 are such that fuel assembly 20 and control assembly 24 respectively are limited to the specified vertical clearance mentioned above.

A support ring 68 is welded to support flange 62. Six instrument guide tubes 70 are equiangularly spaced about the inner periphery of support ring 68 and extend vertically therethrough from a position several inches thereabove, downward through head 14 within tube 60 to a position several feet above the lower end of tube 60. Instrument guide tubes 70 are weldedly joined to and supported by support ring 68. Each of the instrument guide tubes 70 may have a diameter of about one inch. Each of the guide tubes 70, at its lower end, leaves the main guide tube 60 at an angle of about 6° with the vertical at a location about 30 inches above the lower end of tube 60, and accordingly, core 18. Guide tubes 70 are secured at their lower ends, as by welding, to the walls of openings in the tube 60. The centerline of any particular guide tube 70 adjacent its lower end and the centerline of tube 60 are in a common plane. This means that the lower end of each tube 70 opens downward and somewhat outward, radially of GTIT tube 60. The upper end of each tube 70 is welded to the underside of an outward flange on a hollow, generally cylinderical, guide tube end cap 72, each tube 70 being in registry with a different one of six vertical passages through the flange of the end cap. The six passages have substantially the same I.D. as the six tubes 70. The central, vertical extending bore through cap 72 is somewhat oblong-shaped near its upper end and is outwardly enlarged near, but below, the top end to form a breechblock locking seat 73.

Yoke 74 is an annular member slidably encircling part of, and supported by, end cap 72 and including six vertical passages therethrough for registery with the six instrument guide tubes 70 and the passages in the end cap 72. Yoke 74 grippingly engages the upper end of each of six pull tubes 76, each pull tube being positioned and held in registry with one of the six vertical passages through the yoke. A horizontal recess in the outer periphery of yoke 74 provides a lifting seat 75, to be discussed later. Guide tube end cap 72 includes at least one horizontally extending concave recess in the outer surface thereof forming a lock seat 78 above the upper end of yoke 74.

Each pull tube 76 contains four mineral-insulated stainless steel sheathed cables 80 extending the full length thereof and approximately 3 feet beyond the lower end of the pull tube. The pull tube may be relatively stiff along its length however cables 80 are required to be somewhat flexible, particularly below the lower end of pull tube 76. An instrument package 56 is affixed to the bottom end of each group of four cables 80. An instrument package 56 typically includes an eddy-current flow meter and redundant thermocouples, all electrically connected with the cables 80. The flow meter is intended to indicate sodium flow velocity at the outlet of a fuel assembly 20, and the thermocouples are intended to sense and indicate the temperature in that same region.

Each pull tube 76 is intended to be longitudinally movable within and relative to its associated guide tube 70. It includes pull ring seals around its upper end to create a sliding seal with its associated guide tube.

When yoke 74 is seated on end cap 72, pull tube 76 will be fully inserted in its respective guide tube, and the instrument package 56 and the exposed portion of cables 80 will extend downwardly and outwardly beyond the lower end of the guide tube 70. The 6° outward angle of the guide tube 70 and the flexibility of cable 80 serve to laterally displace the instrumentation package 56 from the GTIT tube 60 to a position which is substantially in line with a fuel assembly 20. In fact, guide elements exist at the upper end of the fuel assembly housing 22 to channel, or guide, instrument package 56 into the interior of housing 22 as pull tube 76 is inserted in its guide tube 70. Such guide means may include fins 84 extending upwardly from housing 22 and serving to define a large diameter "mouth" for receiving instrument package 56, and the guide vanes 86 located within housing 22 below fins 84 and angled downwardly and inwardly to channel the instrument package toward the centerline of the fuel assembly. A pedestal 88 is supported by fuel assembly housing 22 therewithin and along the centerline thereof below guide vanes 86 to provide a bottom end support for instrumentation package 56. Fins 84, vanes 86, pedestal 88 and the top end of fuel assembly housing 22 provide a structure for "receiving" the instrument package 56 when it is operationally fully deployed.

A seal is provided between the interior of nozzle 58 and the exterior of GTIT tube 60 by means of a bellows 100 which is sealingly connected at its lower end to support ring 68, in turn sealingly connected to the upper end of GTIT support tube 60, and is connected at its upper end in sealed relationship with collar 102 which in turn is in sealed relationship with the interior wall of nozzle 58. Collar 102 is held in position near the top of nozzle 58 by means of a removable locking ring. One or more O-ring seals about the outer circumference of collar 102 provide the requisite seal between it and the nozzle. The positioning of collar 102 within nozzle 58 is sufficiently above the top end of GTIT tube 60 when it is normally seated to permit tube 60 to be raised a distance of some 20 inches. This explains the need for bellows 100.

An electrical connector assembly 90 is removably positioned above and supported by nozzle 58. Assembly 90 permits the electrical signal cables 80 to be connected with other electrical cables (not shown) which are external to the assembly, while maintaining fluid sealed isolation therebetween. Assembly 90 is in fluid sealing relationship with nozzle 58. The electrical leads extending between the upper end of each pull tube 76 and the terminal blocks on connector assembly 90 are removably connected electrically with cables 80 by means of separable connectors 92 at the upper end of each pull tube. A rigid clamping fitting 94 depends from and forms part of the lower end of connector assembly 90. Clamping fitting 94 encircles, and to a certain extent overlies portions of both guide tube end cap 72 and yoke 74. Those portions of the clamping fitting 94 which overlie end caps 72 and yoke 74 are positioned to axially contact them when assembly 90 is affixed to nozzle 58, thus maintaining GTIT 54 axially seated within reactor 10. Radial centering of both members is also provided by fitting 94. Electrical connectors 92 are carried by and move with clamping fitting 94.

The drive mechanism 28 for the safety control CRITA 50a includes a housing 96 supported by and immediately above connector assembly 90 in removable, fluid sealing relationship therewith. Drive means, such as a motor drivingly connected to a ball screw drive mechanism within housing 96, provide the driving force to vertically, reversibly move a hollow drive rod 98 in driven engagement therewith. Drive rod 98 is drivingly supported within the center of drive housing 96 and extends downwardly therefrom concentrically therethrough connector assembly 90 and within the hollow interior of clamping fitting 94 which in turn extends vertically within nozzle 58, drive rod 98 has a vertical drive stroke of some 38 inches.

A drive rod extension 104 is releasably connected to and depends from the lower end of drive rod 98. A horizontally extending recess in the outer periphery of extension 104 near the top provides a locking seat 105. The coupling between drive rod 98 and drive rod extension 104 is accomplished by a breech block locking arrangement which permits uncoupling by rotation of one rod relative to the other. Extension rod 104 extends downwardly from the drive rod 98, through the central bore in end cap 72, to a position near the bottom of GTIT tube 60 at which point there is a releasable latch and gripping mechanism. Latch and gripping mechanism 106 may be any one of a variety of remotely actuable latches, as for instance, the pneumatically actuated gripping latch disclosed in U.S. Pat. No. 3,733,251 to J. C. Gilbertson et al for "Control Rod Release Mechanism" issued on May 15, 1973. Latch 106 is adapted to releasably engage the upper end of a neutron absorber within control assembly 24, only shaft 108 of the neutron absorber being shown in FIG. 6. The releasable latch depicted in FIG. 6 is of the type described in the aforementioned Gilbertson patent and includes a pneumatically driven actuating rod 110 connected with a camming member 112 to selectively open and close gripping fingers 114. Both drive rod 98 and drive extension 104 are hollow tubular members and serve to provide a conduit for the pneumatic fluid medium. The hollow interior of extension rod 104 communicates directly at its lower end with the cylinder portion of a piston and cylinder arrangement, the piston being affixed to actuating rod 110. The upper end of hollow drive rod 98 is in direct sealed pneumatic communication with a longitudinally extensible gas conduit, such as coiled tubing 116. The other end of tubing 116 exits the drive pressure housing 96 in a pressure sealed manner for connection to external pneumatic driving source (not shown). The latch 106 may be normally biased, as by springs, to the non-engaging or released state, requiring a fluid pressure to overcome this bias and bring fingers 114 into gripping engagement. A scram valve 118 of the energize-to-close type is positioned in the pneumatic fluid conduit intermediate the upper end of drive rod 98 and pneumatic tubing 116.

Biological shielding within the CRITAs 50 is provided by solid circular shielding cylinders 120 and 122 located inside the GTIT tube 60, the outer cylinder 120 having axial holes drilled therethrough to permit passage of the instrumentation guide tubes 70 and cylinder 122 extending concentrically within cylinder 120 and itself including a central vertical passage therethrough for relative movement of drive rod extension 104. This shielding extends vertically a distance at least as great as the thickness of head 114 and is substantially coextensive therewith. These shielding cylinders are attached to GTIT tube 60 and move therewith.

A bellows 124 is sealingly welded at its upper end to the underside of guide tube end cap 72 and is sealingly welded at its lower end to drive rod extension 104.

Bellows 124 is of sufficient length and flexibility to permit relative vertical movement of extension 104 through a stroke length of approximately 38 inches. The bellows seal 124 prevents sodium or sodium vapor from entering the drive housing 96.

Referring now to the operation of a CRITA 50 and particularly safety control CRITA 50a during operation and more particularly during shutdown of the reactor attention is directed to FIGS. 4, 5, 6 and 8a–8e. In FIGS. 4, 5 and 6 CRITA 50a is depicted in the fully installed configuration and having instrumentation passages 56 fully deployed into position within the fuel assemblies 20 of a cluster 48. The drive rod 98 and drive rod extension 104 are shown in the fully withdrawn position to place the neutron absorber in its fully withdrawn position. This is the normal operating configuration for a safety control CRITA. In the event of a scram, gripping mechanism 106 may be actuated to disengage it from the neutron absorber to let the neutron absorber free-fall or the drive rod 98 may be inserted in a controlled manner without disengagement of the neutron absorber.

Referring to FIG. 8a, the GTIT 54 of CRITA 50a remains in reactor 10 following its shutdown, however drive means 28 and the electrical connector assembly 90 have been removed from the CRITA. Drive means 28 was removably secured, as by bolting, to the upper end of electrical connector assembly 90 which was in turn removably connected, as by bolting, to the upper end of GTIT tube 60. Drive means 28 is removed by rotating it through an angle sufficient to disengage the breech block lock at the lower end of drive rod 98 from the upper end of drive rod extension 104, after which the drive means may be removed. Subsequent removal of electrical connector assembly 90 similarly removes clamping fitting 94 from over and around guide tube end cap 72.

In place of connector assembly 90 there is positioned a CRITA drive extension lock (CDEL) 126 which is removably secured to the top of CTIT tube 60. CDEL 126 is used to hold the CRITA assembly within GTIT tube 60 in the raised position during the fuel handling sequences and at any time plugs 42, 44 or 46 are to be rotated. One CDEL 126 is needed for each CRITA 50. Each CDEL 126 has two locks 128 and 130 associated therewith. Lock 128 is adapted to be moved into locking engagement with the lock seal 78 on guide tube end cap 72 when the guide tube end cap, and accordingly GTIT tube 60, have been lifted vertically a sufficient distance for the lower end of the GTIT tube to clear core 18 by some 8 to 10 inches. Lock 130 is positioned for locking engagement with lock seat 105 in extension rod 104 when GTIT tube 60 is raised as mentioned immediately above and drive rod extension 104 is withdrawn upward to its fullest extent within the GTIT tube. This final configuration is depicted in FIG. 8b.

Further referring to FIG. 8a, an auxiliary CRITA drive unit (ACDU) 132 is removably secured, as by bolting, to the upper end of CDEL 126. ACDU 132 contains one drive which substitutes for the conventional drive means 28 to operate the drive rod extension 104 and a second drive which vertically moves GTIT tube 60. Because the ACDU 132 is installed following a scram or shutdown of the reactor and the drive rod extension 104 is in the fully inserted position, the drive for the rod extension must be run down the full extent for engagement with the upper end of rod extension 104 and the connection is made by rotating the ACDU through an angle sufficient to couple the drive means with the breech lock of the drive rod extension. The second drive of ACDU 132 is turn down and rotated into locked engagement with seat 73 in guide tube end cap 72.

In order to disengage the CRITA 50 from core 18, either for refueling of the core or preparatory to removal of the CRITA itself from the reactor, the first drive means of ACDU 132 is energized to withdraw extension rod 104 and accordingly latch 106, to a nearly fully withdrawn position identical to that depicted in FIGS. 4, 5 and 6. Then the second drive of ACDU 132 is energized to raise the entire GTIT a distance of about 4 inches, the housing of latch 106 remaining with the upper shroud of control assembly 24 for alignment purposes. GTIT 54 is then raised another several inches to completely free the instrument packages 56 from the upper ends of the fuel assembly 20 and latch 106 will similarly come free of the upper end of control assembly housing 26. Finally, both drive means of ACDU 132 are energized to complete the full withdrawal of extension rod 104 and latch 106 into GTIT tube 60 and to raise GTIT 54 an additional several inches above core 18. This last configuration is depicted in FIG. 8b at which point both locks 128 and 130 on CDEL 126 are engaged to maintain GTIT 54 in that position.

The above procedure will be repeated for every CRITA 50 in reactor 10, with some modification as regards CRITA 50b and 50c to be discussed below. When all of the CRITs 50 are disengaged from and raised several inches above core 18, any one of the plugs 42, 44 or 46 may then be rotated. Either of the triangular, removable closures 134 in plugs 44 and 46 may be removed and replaced with a refueling assembly (not shown) for carrying out the refueling operation. The design and placement of the rotating plugs in head 14 in such that every fuel and/or control position within the core 18 may be accessed by the refueling assembly.

If it is desirable to remove the entire GTIT 54 from the reactor 10, as for maintenance purposes and/or replacement of an instrument package 56, a CRITA handling cask 136 is employed. Cask 136 must be used, first to maintain the reactor cover gas and second, to shield the contaminated CRITA 50. To remove GTIT 54, the drive means 28 and the electrical connector assembly 90 must be removed as earlier described and handling cask 136 is sealingly secured to the upper end of nozzle 58. Handling cask 136 includes means similar to those of ACDU 132 for liftingly engaging the drive extension rod 104 and means for liftingly engaging seat 73 within guide tube end cap 72. Additionally, there are drive means liftingly gripping the seat 75 in instrument tube yoke 74 for moving it vertically relative to the guide tube end cap 72. The withdrawal sequence of CRITA 50 from core 18 is essentially the same as described above, however it is now ncessary to withdraw instrument packages 56 into GTIT tube 60. The third drive means associated with cask 136 is effective to grip yoke 74 and move it upward relative to end cap 72, and accordingly the GTIT tube, to withdraw the instrument packages 56 into the tube 60. Following this withdrawal of the instrument packages 56 into GTIT tube 60, the entire tube is lifted upwardly entirely into cask 136 by continued lifting of the guide tube end cap 72. It will be noted that collar 102 and baffle seal 100 will similarly be lifted when contacted by the upper flange 62 on GTIT tube 60. When GTIT tube 60 is entirely within handling cask 136 it is moved laterally out of vertical alignment with nozzle 58 and a shield plug 138 is moved into alignment with the nozzle. A fourth drive means associated with cask 136 is then operative to lower shield plug 138 into sealing engagement with and within nozzle 58 and head 14. This latter drive means is then disengaged and handling cask 136, containing GTIT 54, is removed from the area of reactor 10.

In order to resinstall a CRITA 50 in reactor 10 the above described procedure is reversed, including removal of plug 138, resinstallation of GTIT 54 through reactor head 14, partial re-deployment of instrument packages 56, insertion of latch 106 into the upper end of control assembly housing 26 to serve as a guide, and final placement of the GTIT tube 60 and the instrument packages 56.

As noted earlier, neither a detailed drawing nor description of a shim control CRITA 50b is included herein because of its similarity with the safety control CRITA 50a. The major difference between the two is that the shim CRITA 50b is intended for continuous control operation within reactor 10 and thus requires that the latch mechanism and drive rod for the neutron absorber be continuously positionable within the reactor during operation. Appropriate means, such as a rack and pinion drive, provide the requisite lifting force to the drive rod. However, unlike the safety control CRITA 50a, the neutron absorber is not released from the drive extension of a shim control CRITA 50b during a scram. Rather, the drive extension is disengaged from the rack and pinion and allowed to descend while remaining in gripping engagement with the neutron absorber. Further, a manually actuatable release mechanism is employed to disengage the gripper from the neutron absorber following completion of a scram and preparatory to lifting or removing GTIT 54.

While the thirteen centralmost clusters 48 in core 18 include a control assembly 24 therewithin, the remaining clusters in both the outer seed region and the radial blanket portion of core 18 are comprised entirely of fuel assemblies 20. Instrument CRITAs 50c are associated with each of these non-control clusters. An instrument CRITA 50c is depicted in FIGS. 9–13. CRITA 50c is in many respects like the safety CRITA 50a of FIGS. 4, 5 and 6 with identical parts receiving identical numbers, however, only the differences therebetween will be discussed in any detail. GTIT tube 60, instrument guide tubes 70 to a certain extent, pull tubes 76 and instrument packages 56 are the same for the instrument CRITA 50c as for the safety control CRITA 50a. Similarly the electrical connector assembly 90 and clamping fitting 94 are the same as earlier described. However, instead of any driving means being positioned above connector assembly 90, CRITA 50c terminates with an end sealing cap 140 removably and sealingly secured to the top end of the electrical connector assembly.

Instead of a coaxially extending neutron absorber drive mechanism within GTIT tube 60, there now exists an inner drive cylinder 142 and its associated drive extension rod 144. Drive extension rod 144 is preferably an elongated tubular solid member for positioning in the upper portion of GTIT tube 60 and extending upwardly into nozzle 18 within guide tube end cap 72' and clamping fitting 94. Inner drive cylinder 142 is rigidly affixed to the lower end of extension rod 144, is hollow and has a 2 diameter along most of the upper portion of its length, with a 3 diameter along the bottom most two feet of its length. The bottom most inch or two of drive cylinder 142 tapers downwardly and inwardly for alignment purposes. There exists a breech block locking seat 146 in the upper end of extension rod 144 similar to that existing in the upper end of extension rod 104 and the safety CRITA 50a. Lock seat 146 permits the drive extension rod 144 to be drivingly and/or grippingly engaged by one of the drive means of ACDU 132 during movement of the CRITA. During reactor operation extension rod 144 and drive cylinder 142 are maintained axially in position by means of a spring biased plug 148 which is housed within clamping fitting 94 and acts to urge the extension rod and drive cylinder downwardly into snug contact with the spreader and guide fins 150 mounted on the top end of fuel assembly housing 22. Fins 150 serve to guidingly receive the lower end of drive cylinder 42 and also to act as a camming surface to outwardly deflect holddown fingers 64 (here shown rotated into the plane of the picture).

Instead of six instrument packages 56, CRITA 50c has seven instrument packages. Each instrument package 56 is at the lower end of electrical cables 80 which in turn are contained over their uppermost length within pull tubes 76, they in turn being movably housed within instrument guide tubes 70. Also, instead of these being six instrument guide tubes, there are seven, with the additional guide tube being designated 70'. Guide tube end cap 72' includes a ring of seven, instead of six, vertical passages extending therethrough in registry with the six guide tubes 70 and guide tube 70' which are affixed thereto. The instrument guide tubes 70 and 70' extent downwardly from guide tube end cap 72' within GTIT tube 60 and around and spaced from extension rod 144. At a position below the bottom of head 14 there exists a slot or opening 152 in the wall of inner drive cylinder 142. Slot 152 is on that side of cylinder 142 which is adjacent the additional instrument guide tube 70'. Guide tube 70' terminates adjacent slot 152 in a manner which permits an instrument package 56 and the electrical cables 80 immediately thereabove to be directed out of the bottom end of the guide tube, through slot 152, and downwardly into the interior of drive cylinder 142. This may be accomplished by deflecting or contouring the lower end of instrument guide tube 70' radially inward into registry with slot 152. Tube 70' terminates near, but is slightly spaced from drive cylinder 142 to permit relative longitudinal motion therebetween. The remaining six guide tubes 70 are somewhat angularly displaced below the region of slot 152 such that they exit from GTIT tube 60 at uniform angular spacings about its circumference, as previously.

When it is necessary to lift CRITA 50c for rotation of one of the plugs 42, 44 or 46, connector assembly 90 is removed as before and CDEL 126 and ACDU 132 are mounted as described above. The inner drive means of ACDU 132 will liftingly engage the upper end of drive extension rod 144 and the outer drive means will liftingly engage seat 73 in guide tube end cap 72'. These drives are actuated to lift both the inner drive cylinder 142 and the GTIT tube 60. CDEL 126 then locks GTIT 54 in this position.

Complete removal of GTIT 54 from head 14 of reactor 10 is accomplished with the handling cask 136, in essentially the same manner as described for the control CRITAs 50a and 50b. Similarly, instrument CRITA 50c is reinstalled in reactor 10 by the reversal of the removal steps, as described earlier.

It will be understood, therefore, that variations, changes in the details, materials, and arrangements of the parts which have been herein described and illustrated in order to explain the nature of the invention may be made by those skilled in the art within the principles and scope of the invention as expressed in the appended claims.

What is claimed is:

1. An improved core servicing apparatus for a nuclear reactor having a vessel, a head for said vessel, a penetration opening in said head and a core within said vessel of the type having an array of elongated assemblies the improvement comprising:
   a. a support column adapted to be supported by and depend from said head in registry with said penetration;
   b. a plurality of core servicing elements supported by said support column; and
   c. means for laterally displacing at least some of said elements between retracted and extended positions relative to said support column, whereby to vary said servicing apparatus between a laterally compact and a laterally expanded configuration, said laterally displaceable elements each including an elongated resilient drive cable extending upwardly therefrom and said lateral displacement means including a guide channel means for each of said elements and associated drive cables, said guide channel means being supported by said support column and extending generally vertically and being directed laterally outward at its lower end, said drive cables being longitudinally movable to move said elements between a position in said channel means and a position laterally outward thereof beyond said lower end.

2. The apparatus of claim 1 wherein each of said servicing elements is an instrument package, one said instrument package being centrally disposed within a ring of other said instrument packages and said lateral displacement means are operative to laterally displace said other instrument packages.

3. The apparatus of claim 1 wherein said support column is a substantially tubular member and said member, said servicing elements and said lateral displacing means are sized for removable installation through said head penetration in said compact configuration of said compact configuration of said servicing apparatus.

4. The apparatus of claim 1 wherein some of said assemblies include apertures for neutron absorbers and said core servicing elements include a neutron absorber actuating means and a plurality of instrument packages, said instrument packages being said laterally displaceable elements.

5. The apparatus of claim 4 wherein said assemblies are arranged in clusters, each cluster comprising a ring of fuel assemblies in side-by-side relationship around a central neutron absorber-receiving aperture and said neutron absorber actuator is located within a ring of said instrument packages, said neutron absorber actuator for liftingly engaging a said neutron absorber and said instruments for vertical alignment with said fuel assemblies of a cluster within said expanded configuration.

6. The apparatus of claim 1 wherein said support column is a tubular member sized for removable installation through said head penetration and said guide channel means are contained within said tubular member, said channel means lower end terminating at an opening in the wall of said member.

7. The apparatus of claim 1 wherein said core servicing elements include a neutron absorber actuator means and a plurality of instrument packages, said instrument packages being said laterally displacable elements.

8. The apparatus of claim 7 wherein said fuel assemblies are arranged in clusters, each cluster comprising a ring of fuel assemblies in side-by-side relationship around a central neutron absorber receiving aperture and said neutron absorber actuator is located in a ring of said instrument packages, said neutron absorber actuator for liftingly engaging a said neutron absorber and said instrument packages for vertical alignment with said fuel assemblies of a cluster when in said expanded cofiguration.

9. The apparatus of claim 1 wherein at least some of said assemblies are fuel assemblies, said fuel assemblies having means at their upper ends for receiving said servicing elements; said laterally displacable elements are displacable into substantial vertical alignment with said fuel assembly receiving means; and said apparatus further includes means for moving said laterally displacable elements vertically into and out of receipt by said receiving means.

* * * * *